United States Patent
Cameron et al.

(10) Patent No.: US 10,698,876 B2
(45) Date of Patent: Jun. 30, 2020

(54) DISTINGUISH PHRASES IN DISPLAYED CONTENT

(71) Applicant: EntIT Software LLC, Sunnyvale, CA (US)

(72) Inventors: Pashmina Cameron, Cambridge (GB); Sean Blanchflower, Cambridge (GB)

(73) Assignee: MICRO FOCUS LLC, Santa Clara, CA (US)

( * ) Notice: Subject to any disclaimer, the term of this patent is extended or adjusted under 35 U.S.C. 154(b) by 228 days.

(21) Appl. No.: 15/675,472

(22) Filed: Aug. 11, 2017

(65) Prior Publication Data
US 2019/0050399 A1    Feb. 14, 2019

(51) Int. Cl.
G06F 16/23    (2019.01)

(52) U.S. Cl.
CPC .................... *G06F 16/23* (2019.01)

(58) Field of Classification Search
CPC ....................................................... G06F 16/00
See application file for complete search history.

(56) References Cited

U.S. PATENT DOCUMENTS

| | | | |
|---|---|---|---|
| 6,608,615 B1 * | 8/2003 | Martins | G06F 16/9577 345/156 |
| 7,293,019 B2 | 11/2007 | Dumais et al. | |
| 8,140,449 B1 | 3/2012 | Kumar et al. | |
| 8,713,028 B2 | 4/2014 | Moon et al. | |
| 9,342,621 B1 * | 5/2016 | Raphel | G06F 16/9014 |
| 2006/0168510 A1 * | 7/2006 | Bryar | G06F 17/212 715/229 |
| 2010/0017850 A1 * | 1/2010 | More | G06F 21/62 726/2 |
| 2013/0275850 A1 * | 10/2013 | Cudak | G06F 16/9577 715/234 |
| 2016/0103916 A1 | 4/2016 | Even-Zohar et al. | |
| 2016/0188590 A1 | 6/2016 | Cole et al. | |

FOREIGN PATENT DOCUMENTS

| | | |
|---|---|---|
| CN | 101694658 | 4/2010 |
| WO | WO-2013185856 | 12/2013 |

OTHER PUBLICATIONS

Alonso, O. et al., "Duplicate News Story Detection Revisited", 2013, pp. 14. http://www.std.org/~msm/common/DuplicateNews.pdf.

Garcia, I., "Eliminating Redundant and Less-informative RSS News Articles Based on Word Similarity and a Fuzzy Equivalence Relation", Jan. 10, 2017, pp. 62. http://scholarsarchive.byu.edu/cgi/viewcontent.cgi?article=2053&context=etd.

* cited by examiner

*Primary Examiner* — Khanh B Pham (57) ABSTRACT

According to examples, an index of entries may be retrieved, in which each of the entries may correspond to phrases that are analogous to other phrases in content on a network. A plurality of phrases that are similar to the entries in the index may be identified in a content accessed on the apparatus and a determination may be made, based on a user interaction with the accessed content via a user interface, that the user has read a first phrase in the plurality of phrases. The index may be updated to indicate that the user has read the first phrase and, based on the updated index, a second phrase in a subsequently accessed content that is similar to the first phrase may be determined. In addition, the second phrase in the subsequently accessed content may be displayed differently from other displayed phrases in the subsequently accessed content.

20 Claims, 4 Drawing Sheets

DISTINGUISH PHRASES IN DISPLAYED CONTENT

BACKGROUND

Internet access has increased the availability and accessibility of content, such as news articles, journal contents, books, blogs, social media, and webpages. Such content is generally accessible within a short time period after publication and may be accessible to any number of multiple publishers as well as users. In addition, such content is consumed on multiple devices such as smartphones, tablets, computers, and laptops.

BRIEF DESCRIPTION OF THE DRAWINGS

Features of the present disclosure are illustrated by way of example and not limited to the following Figure(s), in which like numerals indicate like elements.

DETAILED DESCRIPTION

For simplicity and illustrative purposes, the present disclosure is described by reference to an example. In the following description, numerous details are set forth in order to provide an understanding of the present disclosure. However, the present disclosure may be practiced without limitation to these details. As used herein, the terms "a" and "an" are intended to denote at least one of a particular element, the term "includes" means includes but not limited to, the term "including" means including but not limited to, and the term "based on" means based at least in part on.

As used herein, the terms, first, second, third, etc., are used to distinguish elements with respect to each other and are thus not intended to be construed as conveying a particular order of operations.

According to examples of the present disclosure, an apparatus may retrieve or otherwise receive an index of entries, for instance, from a server, in which the entries in the index may correspond to phrases that are analogous to other phrases in content on a network. Thus, for instance, the index may include an entry for each phrase in each content on the network that has an analogous phrase in the content or in another content on the network. In examples, analogous phrases may be the same phrase, phrases that convey the same or similar meaning, etc., and may also be described as similar phrases.

The index may store the entries as respective hashes that represent the analogous phrases. As discussed herein, the entries, e.g., hashes, in the index may be used to identify phrases in user-accessed content. The entries may also be updated to indicate that a user has read the identified phrases and the updated entries may be used to identify phrases in a subsequently accessed content that are similar to the phrases that the user has read in a previously accessed content. In addition, the phrases in the subsequently accessed content that have been identified as being similar to previously read phrases may be displayed differently, e.g., distinguished, from the other displayed phrases of the subsequently accessed content.

Use of the entries in the index of entries, e.g., hashes of the phrases, as disclosed herein to identify similar phrases in content accessed at different times may be computationally less intensive as compared with identifying the similar phrases through direct word matching. In addition, use of the index of entries in the identification of similar phrases as discussed herein may result in a more accurate identification of the similar phrases.

According to examples, a user may access, e.g., retrieve, download, etc., content such as articles, web blogs, social media content, etc., on the apparatus. The user may retrieve and access content on the apparatus from a network such as the Internet, a particular domain on the Internet, a private domain, etc. In any regard, the apparatus may compare the phrases in the accessed content with the entries in the index of entries to determine which of the phrases may be similar to which of the phrases to which the entries correspond, if any. For instance, the apparatus may generate hashes for each of the phrases in the accessed content and may determine if any of the generated hashes matches any of the hashes in the entries.

In addition, the index may be updated to indicate that the user has read a phrase corresponding to an entry in the index. That is, for instance, the entry corresponding to the read phrase may be highlighted or otherwise identified as having been read in the index. Moreover, when the user subsequently accesses content, the apparatus may identify a second phrase in the subsequently accessed content that is similar to a phrase that the user has already read in a previously accessed content. Particularly, the apparatus may compare phrases in the subsequently accessed content with the entries in the index that are identified in the index as having been read in the previously accessed content. The apparatus may also display the phrases in the subsequently accessed content differently from other displayed phrases of the subsequently accessed content. As such, for instance, the user may quickly identify phrases in the subsequently accessed content that the user may have already read and may thus skip over those phrases if the user so chooses.

As used herein, content may be any document containing a phrase, such as a news article, a newsletter, a webpage, a portable document file document, a word document, and the like. A phrase may be a group of two or more words. Examples of phrases may include a part of a sentence, a sentence, a paragraph in a content, and/or the like. A phrase may be analogous or similar to a second phrase if the phrase is identical to the second phrase, if the phrase has the same or similar meaning as the second phrase, or the like. For example, the phrase "One small step for man, one giant leap for mankind," may be construed as being similar to the phrase, "A tiny step for one person, one gigantic jump for humankind," because they share a common meaning even though they are not identical.

A hash may be a string of values that maps a phrase to a bit-string, in which the bit-string uniquely identifies the phrase. As discussed herein, the apparatus may use the hash of the phrase to identify the occurrence of the phrase in a subsequently accessed content. A network may be the Internet (e.g., a global communication network that allows many computers worldwide to connect and exchange information), an intranet, a domain, etc.

The apparatus may determine that a user has read phrases in a content based on the user interaction with the content. By way of example in which the user interaction with the content is an amount of time that the user spent on the content, e.g., the amount of time that the content was displayed on a user device, the apparatus may determine that the user read the content when the amount of time spent on the content is within a threshold, e.g., a time threshold, a scroll threshold, or the like. The time threshold may be based on the average amount of time for reading the content, such as the amount of time taken by, for instance, the 95 percentile of a group of users to read the content, where the amount of time taken by the users may be distributed on a bell curve. In another example, the time threshold may be based on an average amount of time that a user takes in reading the content. In an example, the average amount of reading time may be based on the readability score for the content such as Flesch's readability index. In examples, when a user is determined as having read a portion of the content, the user is also considered to have read the phrases in the portion of the content.

Examples of user interaction with the content may include, amount of time spent on the content, scrolling speed on a screen on which the content is displayed, scrolling a part of the content to view other parts of the content, clicking a link on a page of the content to view other page of the content, moving a cursor with respect to the content displayed on a screen, interacting with a touch screen displaying the content, interacting with the program displaying the content to close the content, moving between pages of the content or moving to a new content, selecting an area of the content, a combination of the above, and/or the like. By way of particular examples in which the user interaction is the scrolling speed when displaying the content, the scrolling speed determined during a user interaction with the content may be construed as being within a certain threshold in response to the scrolling speed determined during the interaction with the content being below the average scrolling speed of a user that was obtained during a calibration test. Thus, the content in this example may be construed as having been read when the measured scrolling speed is within the certain threshold.

The Internet has increased availability and access to a variety of content. Often, content is available from multiple sources or is updated content from the same content source. As such, content from multiple sources or even the same content source may be redundant and therefore may be considered to be analogous to each other. For instance, content may be derived from similar sources, may contain similar facts, may contain similar quotes, and/or the like. Before the Internet was widely available, analogous content was less common because different publications were printed on paper and distributed using a physical infrastructure, which required time and access was not instantaneous and was often expensive. On the Internet, however, the number of analogous or similar content is often amplified due to the ease of reproducing and accessing the content. The multiplicity of easily accessible content on the Internet may create a technical problem in computer networks and devices connected to the computer network and document processing for displaying analogous content on a display. For instance, content having the same or similar information is often displayed more than once on a device, which may make the device consume relatively large amounts of wasted energy in displaying the similar information, receiving the information over a cellular network, and the like.

The apparatus disclosed herein addresses this technical problem. In an example, the apparatus may retrieve the index from a server, track content, identify analogous phrases in subsequently accessed content and track analogous phrases in the subsequently accessed content accessed via the apparatus that a user has read. The apparatus may then display the analogous phrases that the user has read in the subsequently accessed content differently from other phrases in the subsequently accessed content, e.g., the analogous phrases may be displayed differently to distinguish those analogous phrases that the user has read from other information in the content, such as new information, updates to content, and the like. By displaying the previously read content differently, the apparatus may display the content more efficiently, e.g., readers may skip over the differently displayed phrases.

Another technical problem with displaying analogous information more than once on the apparatus is an increase in power consumption of the apparatus to display the analogous information. For example, active display screens in computing devices, such as mobile phones, tablet computers, etc., may consume more power when displaying content due to, for instance, the backlighting used in the displays. The apparatus, according to examples disclosed herein, may display the new information differently from previously read information, which may speed up consumption of the content, and may thus reduce power consumption.

A further technical problem with displaying analogous phrases more than once on the apparatus using displays, such as active-matrix organic light-emitting diodes, is that white pixels consume more power compared to darker pixels. The apparatus described herein may display the analogous phrases on a gray background and may display other phrases such as new phrases or updates on a white background, which may reduce the amount of power that the apparatus consumes in displaying the content.

Figure 1A:
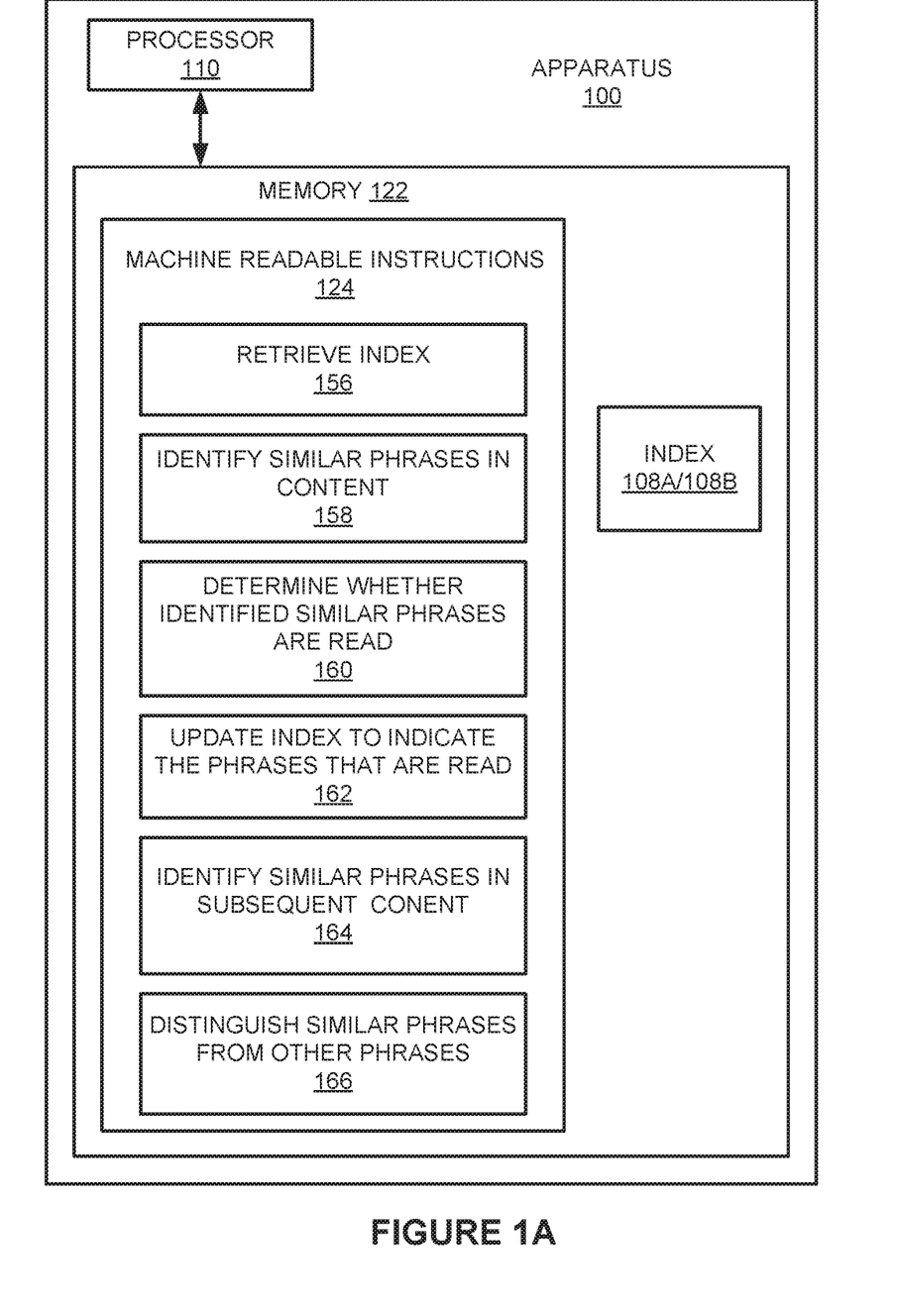
FIG. 1A illustrates a block diagram of an example apparatus for distinguishing phrases in a displayed content that are similar to phrases in a previously accessed content.

With reference to FIG. 1A, there is shown a block diagram of an example apparatus 100 for distinguishing phrases in a displayed content (e.g., subsequently accessed content) that are similar to phrases in a previously accessed content. The apparatus 100, which may be a computing device, a server computer, or the like, may display content accessed from a network, e.g., content on the Internet, on a display. Generally speaking, the apparatus 100 may display the accessed content, identify phrases in the accessed content that are similar to phrases listed in an index of entries, track a phrase that a user has read in the accessed content, identify phrases in a subsequently accessed content that are similar to the phrases that the user has read in the accessed content, and display the identified phrases in the subsequently accessed content differently from other displayed phrases of the subsequently accessed content. In examples, a server may generate the index of entries and the apparatus 100 may retrieve the index of entries from the server.

It should be understood that the apparatus 100 may include additional components and that one or more of the components described herein may be removed and/or modified without departing from a scope of the apparatus 100. For instance, the components of the apparatus 100 are shown as being on a single computing device or server as an example and in other examples the components may exist on multiple computers or servers. In addition, or in other examples, the apparatus 100 may include multiple processors, a multiple core processor, a plurality of multiple core processors, or the like. The apparatus 100 may also include multiple memories. As such, the apparatus 100 is described as including a single processor 110 and a single memory 122 for purposes of simplicity.

The apparatus 100 may include a processor 110 and a memory 122 that stores machine readable instructions 124 that the processor 110 may execute. The processor 110, which may be a microprocessor, a micro-controller, an application specific integrated circuit (ASIC), a graphical processing unit, or the like, may perform various processing functions in the apparatus 100. The processing functions that the processor 110 performs, and other functions, operations and methods described herein may be embodied in the machine readable instructions 124. In addition to storing the machine readable instructions 124, the memory 122 may store data or functions, such as an index of entries 108B (shown in FIG. 1B), which is also referenced herein as an index 108B.

Figure 1B:
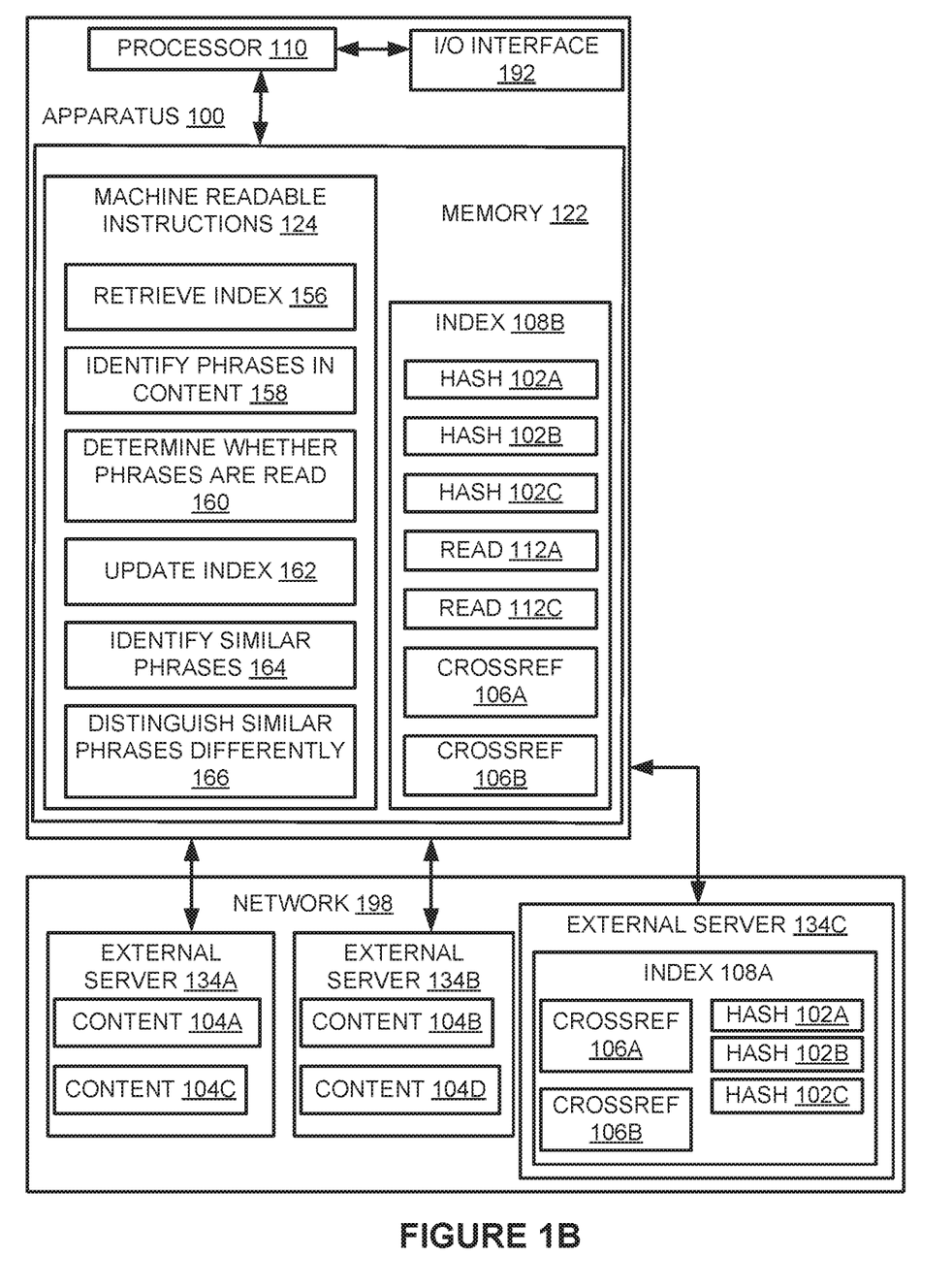
FIG. 1B illustrates an example system for distinguishing phrases in a displayed content including the example apparatus depicted in FIG. 1A.

As shown in FIG. 1A, the machine readable instructions 124 may store instructions 156 to retrieve an index 108A, e.g., retrieve the index 108A from a server through a network 198 (shown in FIG. 1B). For example, the entries in the index 108A may be hashes 102A-1020 (shown in FIG. 1B), in which each of the entries (e.g., hashes 102A-1020, which are collectively represented herein as hashes 102) may correspond to an analogous phrase that is present in content 104A-104D published on a network 198 (shown in FIG. 1B), e.g., on the Internet, a domain, an intranet, etc. An analogous phrase may represent multiple similar phrases that are present in multiple ones of the content 104A-104D.

The machine readable instructions 124 may also store instructions 158 to identify phrases in the accessed content 104A that are similar to the entries, e.g., hashes 102, in the index 108A. The machine readable instructions 124 may further store instructions 160 to determine whether a user read a phrase, e.g., a first phrase in the accessed content 104A via the apparatus, that is similar to a phrase corresponding to one of the entries, e.g., hashes 102 in the index 108A. The processor 110 may execute the instructions 160 to determine whether the user read the similar phrase based on a user interaction with the content 104A. For example, the processor 110 may determine whether the user read the similar phrase in the accessed content 104A based on the amount of time the user spent on the accessed content 104A.

The machine readable instructions 124 may further include instructions 162 to update the index 108A to indicate that the user has read a particular phrase corresponding to an entry. The machine readable instructions 124 may store instructions 164 to identify, based on the updated index 108B, a phrase, e.g., a second phrase in a collection of phrases, in a subsequently accessed content 104B that is similar to an entry, e.g., a hash 102, in the updated index 108B that is indicated as having been read by the user. The machine readable instructions 124 may store instructions 166 to display the phrase, e.g., the second phrase, that has been identified as being similar to an entry in the updated index 108B that is indicated as having been ready by the user differently from other displayed phrases in the subsequently accessed content 104B. In other words, the instructions 166 may cause the processor 110 to distinguish the phrases in the subsequently accessed content 104B that are similar to the phrases in a previously accessed content 104A from the other displayed phrases of the subsequently accessed content 104B. For example, the second phrase in the subsequently accessed content may be highlighted with a color other than white.

Turning now to FIG. 1B, there is shown a block diagram of another example system for distinguishing phrases in a displayed content, including the example apparatus 100 depicted in FIG. 1A. It should be understood that the example system depicted in FIG. 1B may include additional components and that one or more of the components described herein may be removed and/or modified. As shown in FIG. 1B, the apparatus 100 may include the processor 110, the memory 122, and the machine readable instructions 124 discussed with respect to FIG. 1A. The memory 122 may also include the index 108A retrieved from the network 198.

The processor 110 may execute the machine readable instructions 124 as described with reference to FIG. 1A above to identify phrases in a subsequently accessed content 104B that are similar to phrases in a previously accessed content 104A based upon entries contained in the index 108A. In addition, the processor 110 may execute the machine readable instructions 124 as described with reference to FIG. 1A to display the similar phrases in a manner that distinguishes those similar phrases from other displayed phrases of the subsequently accessed content 104B. Further examples are provided below with reference to FIG. 1B, to describe the example system.

As shown in FIG. 1B, the apparatus 100 may be in communication with external servers 134, which are shown as external servers 134A, 134B and 134C. The external servers 134 may be on the network 198. In examples, the external server 134A may publish content 104A and content 104C and the external server 134B may publish content 104B and 104C on the network 198. For example, a news company may host news content on an external server on the Internet and another news company may host news content on another server on the Internet. In examples, the external server 134C may host the index 108A.

In examples, the index 108A may be generated and stored on the external server 134C. A processor (not shown) on the external server 134C may execute machine readable instructions (not shown) to retrieve the content 104A-104D from the external servers 134A, 134B. In addition, the processor on the external server 134 may create an index 108A from the retrieved content 104A-104D. In examples, to identify analogous phrases in the content 104A-104D, the processor on the external server 134C may normalize the content 104A-104D, e.g., by removing any punctuation marks that may be present in the content 104, by standardizing certain types of terms (e.g., converting numerical values to words), etc.

Examples of approaches that the processor on the external server 134C may use to identify analogous phrases in the content 104A-104D may include implementation of machine learning algorithms, such as classifiers including deep learning classifiers, reinforcement learning, semi-supervised learning, cluster analysis, hierarchical clustering, association rule learning, artificial neural network, unsupervised learning, linear classifier, decision tree, Bayesian analysis, and the like. The processor on the external server 134 may generate the entries, e.g., hashes 102A, 102B, and 102C, that correspond to the analogous phrases identified in the content 104A-104D. Also, the processor on the external server 134C may create cross-references 106A and 106B between the content 104A-104D using machine learning algorithms. In any regard, the index 108A may relate a first content 104A and a second content 104B in response to a determination that the first content 104A and the second content 104B contain analogous phrases with respect to each other. In addition or in other examples, the index 108A may identify, via the cross-references 106, content 104A-104D that relate to the same area of interest with respect to each other.

In examples, the external server 134C may periodically generate the index 108A. In addition or in other examples, multiple users may share the index 108A. In addition or in other examples, the index 108A may have a common shared component that the external server 134C may generate periodically and a component generated on an apparatus 100 of the user that applies to that user. For example, analogous phrases that the user has read 112A, 112C may be stored in the index 108B. The index 108B may be stored on the external server 134C at the end of a user session on the apparatus 100 and may be used to identify phrases in subsequently accessed content on the apparatus 100 that are similar to phrases in previously accessed content on the apparatus 100. Examples of apparatus 100 may include devices that allow display of information to a user such as mobile devices, desktops, laptops and the like.

The processor 110 may access the index 108A from the external server 134C and may store a copy of the index 108A as index 108B in the memory 122. The processor 110 may identify phrases in a currently accessed content 104A that may be similar to the entries, e.g., hashes 102, in the index 108B. In examples, the processor 110 may use the cross-references 106 to identify a sub-group of the entries, e.g., hashes 102, to determine phrases in the currently accessed content 104A that are analogous to the entries in the index 108B. For example, assume content 104C on the external server 134A pertains to the Apollo moon landing and content 104D on the external server 134B pertains to the Apollo moon landing. The index 108B may contain a cross-reference 106A between the content 104C and the content 104D. In examples, the cross-reference 106A may link the content 104C with the content 104D. In examples, the cross-reference 106A cross linking the previously accessed content 104C and 104D may be in addition to the links establishing a link between analogous phrases in the content 104C and the content 104D.

In examples, the previously accessed content 104C and the content 104D may contain the same phrase (e.g., "One small step for man, a giant leap for mankind.") The cross-reference 106A may identify a sub-section of entries, e.g. hashes 102, that may be included in the index 108B and may represent analogous phrases in the previously accessed content 104A and 104B. The processor 110 may identify analogous phrases in the content 104D using the cross-reference 106A, and in turn, may identify analogous phrases in content 104C.

The processor 110 may determine which of the phrases in a content 104C a user has read based on a determination of a user interaction with the content 104C. By way of example, assume the content 104C is displayed on the screen in its entirety and the user spent an amount of time similar to the average amount of time spent by users in reading the content 104C in its entirety. In this example, the processor 110 may determine that the user read the content 104C in its entirety and thus the phrases in the content 104C. In other examples, the processor 110 may determine that a user has read phrases in a portion of the accessed content 104C based on the user interaction with the content 104C. For example, the user interaction with the accessed content 104C may be a scrolling action between a first part of the content 104C and a second part of the content 104C and the portion of the accessed content 104C that contains user read phrases may be the portion of the content 104C between the first part and the second part of the content 104C.

By way of example, the processor 110 may determine that the user spent a similar amount of time as the average amount of time spent by a group of users with the content 104C displayed via a user interface. Based on a determination that the user spent an amount of time similar to the average amount of time, the processor 110 may determine that the user read the phrases in the portion of the content 104C displayed on the screen.

In examples, the processor 110 may use a certain threshold to make the determination as to whether the user read the phrases in the portion of the content 104C. The amount of time that a user spent on the content 104C may be within a certain threshold when the processor 110 measures the amount of time spent by the user interacting with the content 104C and the measured amount of time is less than a calibrated amount of time. The calibrated amount of time may be derived from the amount of time that the user or a group of users spent on a calibration test. The calibration test may be based on the amount of time spent by the user or a group of users on test content or multiple test content. In other examples, the calibrated amount of time may be derived from an average amount of time spent by other users on the content 104A. For example, the processor 110 may determine that the user read the phrases in the portion of the content 104C in response to the calibrated amount of time exceeding the certain threshold.

In examples, the processor 110 may determine user interaction with the content 104C through an input/output interface 192 (I/O interface). The I/O interface 192 may include a hardware interface and/or an interface created using machine readable instructions. Examples of the I/O interface 192 may include a keyboard, mouse, touch screen, or the like. In other examples, the processor 110 may determine whether the user read a portion of the content 104C based on the scrolling time or scrolling speed of the user while interacting with the content 104C. The scrolling time or scrolling speed on the content 104C may be within the certain threshold, when the determined scrolling time or scrolling speed measured for the content 104C through the I/O interface 192 is less than a calibrated scrolling time or scrolling speed on test content for the user and/or a group of users. In examples, when the amount of time spent on the content 104A is outside a certain threshold, e.g., below the certain threshold, the processor 110 may determine that the content 104A was skipped and the index 108B may not be updated.

In examples, the processor 110 may determine a portion of the content 104C that includes phrases that the user has read based on the user interaction with the content 104C. The processor 110 may determine whether the user read the portion of the content 104C as described above. The processor 110 may also determine whether any of the phrases in the determined portion of the content 104C is similar to entries in the index 108B as also described herein. The processor 110 may further update the index 108B to indicate that the user has read the phrase (or phrases) corresponding to the entry (or entries) that is similar to the determined phrase (or phrases) in the determined portion of the content 104C. For instance, the processor 110 may update read variables 112 (collectively denoting 112A and 112C) in the index 108B to indicate that the user read the phrases. Thus, the processor 110 may use the read variables 112 to identify the entries in the index 108B that correspond to phrases that are similar to the phrases in the content 104A that the user has read. Similarly, the processor 110 may identify entries in the index 108B that correspond to phrases that are similar to phrases in the content 104C that the user has not read. The processor 110 may not update the index 108B to indicate the entries corresponding to the phrases that the user has not read.

The processor 110 may determine whether a subsequently accessed content 104D was accessed from the network 198. The processor 110 may use the entries corresponding to the phrases in the updated index 108B, and the read variables 112 to identify the phrases in the subsequently accessed content 104D that are similar to the phrases that the user has read in the previously accessed content 104C. In examples, the processor 110 may identify phrases in the subsequently accessed content 104D that the user has read at some instance in time prior to the user accessing the subsequently accessed content 104D. For example, the processor 110 may identify the phrase, "One small step for man, a giant leap for mankind," in the content 104D as having been read when a phrase, "A tiny step for one person, one gigantic jump for humankind," is present in the previously accessed content 104C and was read by the user prior to the user reading the subsequent content in 104D based on the information indicated in the index 108B.

In examples, the processor 110 may identify phrases in accessed content 104 that are similar to the entries, e.g., hashes, phrases, etc., in the index 108B. The processor 110 may make this identification using a machine learning model. In examples, the machine learning model may run on the external server 134C and the external server 134C may return results including phrases that are similar to the entries in the index 108B based on a request from the processor 110. For example, the machine learning model may use deep learning computational neural networks to identify phrases in the accessed content 104C that are similar to the entries, e.g., hashes 102, in the index 108B. The hashes 102 in the index 108B may represent phrases that are recited in a plurality of the content 104 on the network 198. The computational neural network may be trained using a training dataset to identify similar phrases that are worded differently. Examples of machine learning used to identify similar phrases may include bag-of-words models, word vector models, paragraph vector models, latent semantic indexing, latent Dirichlet allocation, deep semantic similarity models, and the like. In examples, the content 104D may contain the phrase, "That's one small step for a man, one giant leap for mankind." The machine learning model may identify the similar phrase "A tiny step for one person, one gigantic jump for humankind," using computational neural networks. In examples, the machine learning model may store the entries corresponding to the analogous phrases in the index 108B.

The processor 110 may display the phrases in the subsequently accessed content 104D that are similar to the entries, e.g., hashes 102, in the index 108B differently from other displayed phrases of the subsequently accessed content 104D. In other words, the processor 110 may display the phrases in the subsequently accessed content 104D that are similar to the phrases in a previously accessed content 104C that a user has read differently from the other displayed phrases in the subsequently accessed content 104D. In examples, the processor 110 may display the similar phrases in the subsequently accessed content 104D in a distinguished manner prior to the user reading the subsequently accessed content 104D. In examples, the processor 110 may display the similar phrases differently by highlighting the similar phrases in the subsequently accessed content 104D using a different color, such as gray, placing an overlay on a portion of the subsequently accessed content 104D, etc. By way of particular example, in content describing the Apollo landings such as the content 104C and the content 104D, the processor 110 may display the phrase "One small step for man, a giant leap for mankind," in the subsequently accessed content 104D in gray to indicate that the user has already read that phrase prior to the user reading the subsequently accessed content 104D. In another example, the content may be portable document files, and the processor 110 may highlight the similar phrases in the subsequently accessed content 104D using an overlay on the display screen to change the color of the similar phrases when displayed on a screen. The overlay may be displayed as a semi-transparent block to gray-out the similar phrases.

In examples, the processor 110 may determine that the subsequently accessed content 104D was published after the index 108B was generated or updated and may access an updated index 108B from the external server 134C. Also, the processor 110 may use the updated index 108C to identify phrases in a subsequently accessed content 104D that are similar to the phrases that the user read in a previously accessed content 104C.

In examples, the processor 110 may identify a portion of interest in the accessed content 104A. The portion of interest in the accessed content 104A may be identified based on a user interaction via the user interface (not shown) of the apparatus 100 within the content 104A. The portion of interest may be identified based on a first location and a second location in the accessed content 104A. In another example, the portion of interest may be identified based on the beginning of the accessed content 104A, and a location of a user interaction received via the user interface of the apparatus 100. In examples, the portion of interest may be identified by paragraph headers before and after the portion of interest in the accessed content 104A. For example, recurring newsletters may use a similar layout, and the user may be interested in the summary section of the newsletter, which may be bound by the paragraphs in the summary section and a subsequent heading. In another example, some phrases may identify the boundaries of the portion of interest.

In other examples, the processor 110 may use the user interaction with the accessed content 104A to identify the first location and the second location of a portion of interest in the content 104A. The processor 110 may use the external server 134C to identify paragraph headers and/or analogous phrases in multiple content to identify the portion of interest in a subsequently accessed content 104B. The portion of interest identified by the user may be updated to the index 108B. For example, when some phrases identify the boundaries, e.g., a beginning and an ending, of the portion of interest, the index 108B may be updated with the determined phrases to identify the portion of interest. The updated index 108B may be used to identify the portion of interest in the subsequently accessed content.

In examples, the index 108B may be updated with the entries, e.g., hashes 102, corresponding to phrases that are in the portion of interest in content 104, in which the entries correspond to analogous phrases based on the cross-reference 106. For example, periodic newsletters may be cross-referenced in the index 108A. The processor 110 may request the external server 134C to use machine learning to identify phrases such as phrases commonly used in the portion of interest that identifies the portion of interest, phrases that are present before or after the portion of interest, phrases that are analogous to phrases that are used in the portion of interest, or the like.

The processor 110 may display the portion of interest in the subsequently accessed content 104D that is similar to the portion of interest identified in a previously accessed content differently from the other portions of the subsequently accessed content 104D. In addition or in other examples, the processor 110 may identify the portion of interest in the subsequently accessed content and may display the phrases in the portion of interest that are similar to the entries in the index 108A that have been identified as having been read by the user in a previously accessed content 104C.

Further, the processor 110 may use the index 108B to identify phrases in the subsequently accessed content 104D that are similar to the entries in the index 108B that the user has read based upon a user interaction with the subsequently accessed content 104D. The processor 110 may also update the index 108B to indicate that the user has read the identified phrases. Thus, the processor 110 may update the index 108B, and the index 108B may evolve to reflect phrases that the user has read in the subsequently accessed content 104D.

In examples, the processor 110 may determine whether subsequently accessed content 104D is similar to the previously accessed content 104C based on a ratio between a count of the number of words in the phrases corresponding to the entries that are identified in index 108B as having been read by the user in the previously accessed content 104C and a count of the total words in the subsequently accessed content 104D. That is, the processor 110 may determine a ratio between the number of words in the phrases of the previously accessed content 104C that the user has read that are similar to the phrases in the subsequently accessed content 104D and the total number of words in the subsequently accessed content 104D. The processor 110 may determine this ratio to identify how similar the subsequently accessed content 104D is to the previously accessed content 104C prior to the user reading the subsequently accessed content 104D.

In addition, the processor 110 may determine whether the ratio of the count of words in the similar phrases in the subsequently accessed content 104D to the total count of words in the subsequently accessed content 104D is within a similarity threshold. In examples, when the ratio is within the similarity threshold, the subsequently accessed content 104D may be construed as being similar to the previously accessed content 104C and the subsequently accessed content 104D may be determined as containing no additional phrases that add information or as containing very few phrases that add new information. In response to a determination that the ratio is within the similarity threshold, the processor 110 may remove links to the subsequently accessed content 104D or may assign a lower priority to the links to the subsequently accessed content 104D by displaying the links lower in the list of content available for reading. By way of particular example, the similarity threshold may be about 0.02 (e.g., about 10% of the words in the subsequently accessed content 104D were not read by the user.) In another example, the processor 110 may change the color of the links to the subsequently accessed content 104D to indicate that the subsequently accessed content 104D is similar to the previously accessed content 104C that the user has already read.

Figure 2:
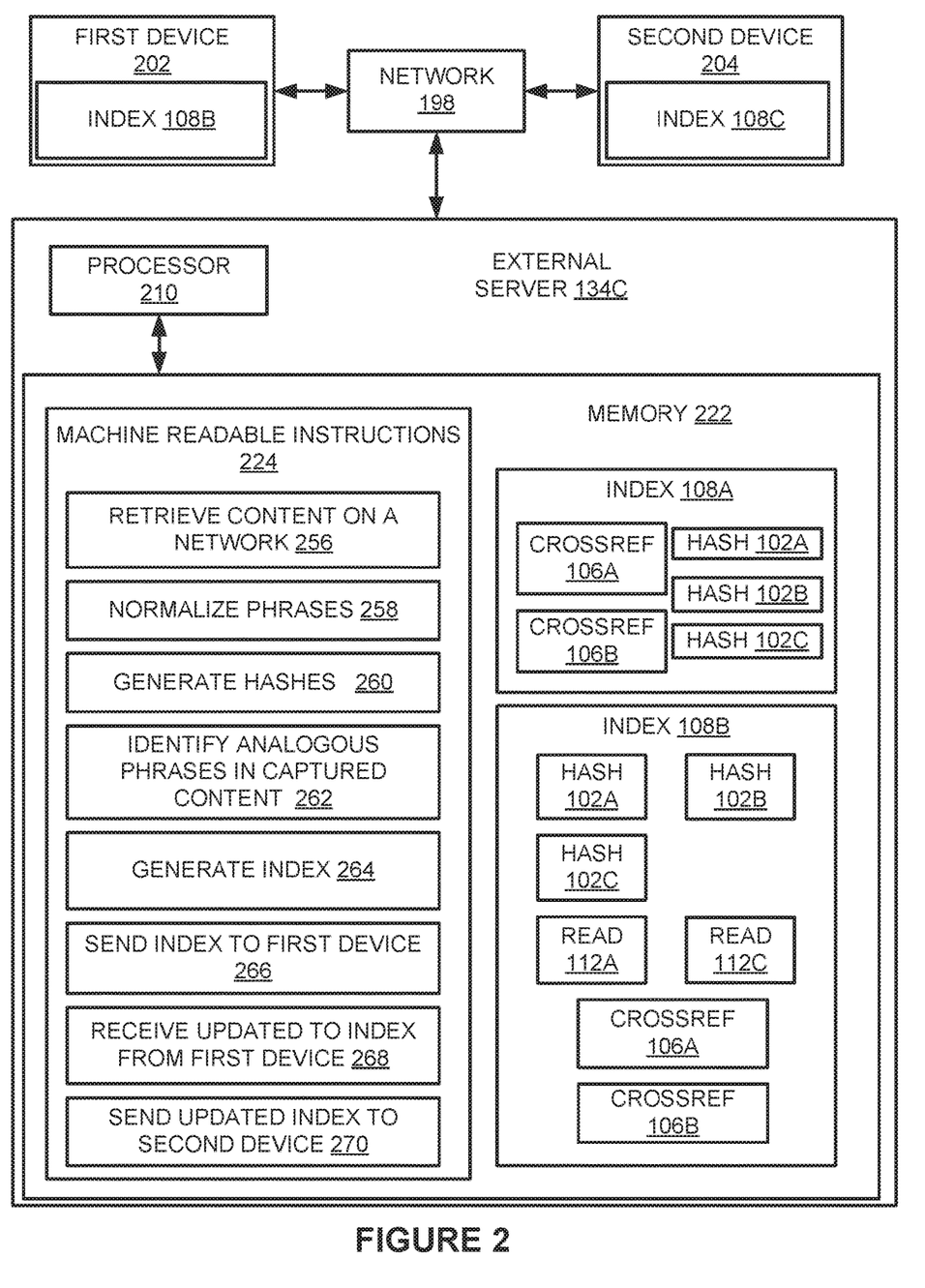
FIG. 2 illustrates another example system for distinguishing phrases in a displayed content.

With reference now to FIG. 2, there is shown a block diagram of another example system for distinguishing phrases in a displayed content. Generally speaking, the system depicted in FIG. 2 may synchronize an index 108B, 108C between multiple devices 202, 204 to display similar phrases of content 104 on the devices 202, 204 differently from other phrases. Also shown in FIG. 2 is the external server 134C from FIG. 1B. The external server 134C may include a processor 210 and a memory 222. The memory 222 may include machine readable instructions 224. The memory 222 may also store the index 108A generated by the external server 134C. Also, the memory 222 may store updates to the index 108B generated by the first device 202 or updates to the index 108C generated by the second device 204. The external server 134C may synchronize the indexes 108B and 108C between multiple devices 202, 204, and may maintain updates for the user to allow the user to use multiple devices 202, 204 and display similar phrases of content 104 on the multiple devices 202, 204 in a distinguished manner from other phrases of the content 104.

The machine readable instructions 224 may store instructions 256, which the processor 210 may execute to retrieve a plurality of contents 104 published on the network 198. The network 198 as discussed above with respect to FIG. 1B may be connected to external servers that provide the contents 104. The processor 210 may execute the instructions 258 to preprocess the contents 104 such as by normalizing the phrases in the contents 104, removing punctuation marks and spaces, and the like. After preprocessing the contents 104, the processor 210, may execute the instructions 260 to generate hashes of the phrases in the retrieved contents 104. The processor 210 may execute the instructions 262 to identify analogous phrases in the retrieved plurality of content 104. In examples, the processor 210 may use machine learning to iteratively compare different hashes of the phrases in the retrieved plurality of contents 104 to identify the analogous phrases.

Also, the processor 210 may use machine learning as discussed above with reference to FIG. 1B to generate entries, e.g., hashes 102. The hashes 102 may represent phrases that are identical or phrases that are similar to phrases appearing in multiple ones of the contents 104. Also, the processor 210 may execute the machine readable instructions 224 to create cross-references 106 between contents 104 that include analogous phrases. The processor 210 may execute the instructions 264 to generate an index 108A based on the retrieved plurality of content 104, the hashes 102 and the cross-references 106. The entries, e.g., hashes 102, may be expressed in the index 108A and may correspond to the analogous phrases. In examples, the processor 210 may generate the index 108A with the hashes of analogous phrases that are included in a first and a second content of the contents 104.

The processor 210 may execute the instructions 266 to transmit the index 108A to the first device 202 when the user accesses a content 104A from the network 198 on the first device 202. The first device 202 may, as described above with respect to FIG. 1B, the apparatus 100 and may use the index 108A to identify phrases in the accessed content 104A that are similar to the analogous phrases corresponding to the entries in the index 108A. The first device 202 may also update the index 108A to generate an updated index 108B to indicate that the user has read the entries that corresponding to phrases that are similar to the determined analogous phrase.

When requested by the first device 202, the processor 210 may execute the instructions 266 to receive the updated index 108B. The processor 210 may store the updated index 108B in the memory 222. The processor 210 may execute the instructions 270 to send the updated index 108B to the second device 204 when the user subsequently accesses content 104B on the second device 204. A processor (not shown) on the second device 204 may use the updated index 108B received from the external server 134C to identify phrases in a subsequently accessed content 104B that are similar to the phrases corresponding to the entries, e.g., hashes 102, in the updated index 108B that are identified as having been read by the user on the first device 202.

The second device 204 may further update the updated index 108B to create a further updated index 108C to indicate the entries that correspond to phrases in the subsequently accessed content 104B that the user has read on the second device 204. In addition, the second device 204 may display the phrases in the subsequently accessed content that the index 108B identifies as having been read by the user differently from the phrases in the subsequently accessed content that have not been identified as having been read by the user. For example, the second device 204 may highlight the identified phrases on a display. The second device 204 may also send the updated index 108C to the external server 134C In examples, the external server 134C may send updated versions of the index 108B, 108C to the devices 202, 204 when new content 104 is published by retrieving the published content from the network 198 and the index 108A is updated. In addition or in other examples, the user may access contents 104 on the network 198 on the first device 202 that were published after the index 108A was generated by the external server 134C and may request that the index 108A be updated to reflect the newly accessed contents 104.

Figure 3:
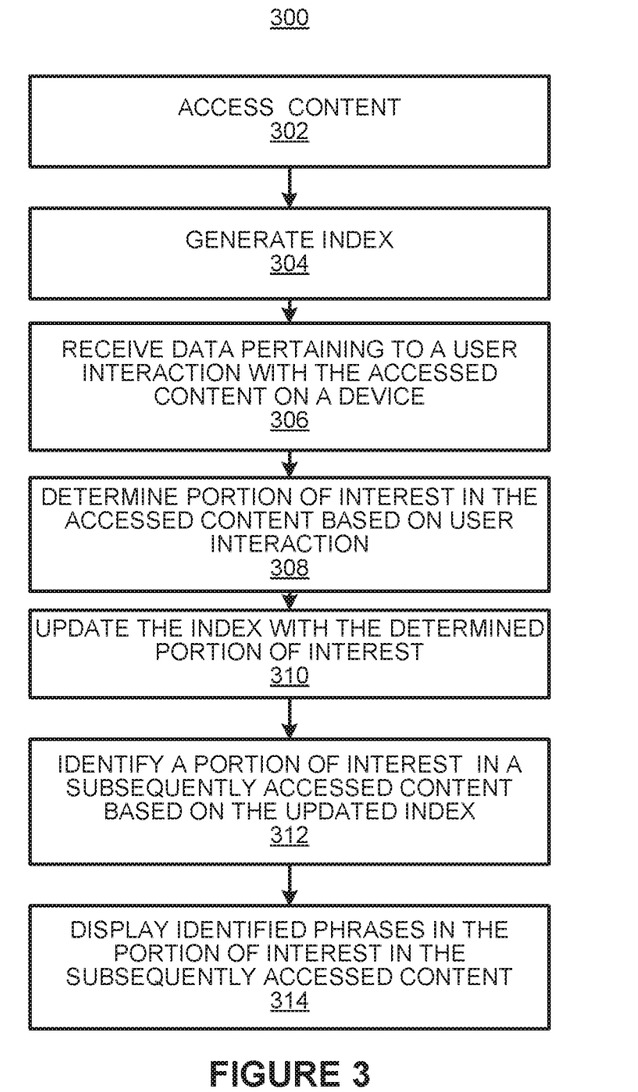
FIG. 3 illustrates a flow chart of an example method of displaying identified phrases in a subsequently accessed content differently from other phrases in the subsequently accessed content.

FIG. 3 shows an example method 300 of displaying identified phrases in a subsequently accessed content 104D differently from other phrases in the subsequently accessed content 104D. The processor 110 may execute the method 300 and other methods described herein. For example, the processor 110 shown in FIGS. 1A and 1B may execute the machine readable instructions 124 to execute the method 300. Although particular reference is made herein to the processor 110 executing the method 300, it should be understood that another device or multiple devices may execute the method 300 without departing from the scope of the method 300.

At block 302, the processor 110 may access a content 104A on the network 198. For example, the content 104A may be a newsletter available online that has a portion of interest, such as a summary of recent developments in a certain topic area.

At block 304, the processor 110 may generate an index 108A of the phrases in the accessed content 104A and may express the phrases in the index 108A as entries, e.g., hashes. To generate the index 108A, the processor 110 may normalize the phrases in the accessed content 104A as discussed with respect to FIG. 1B and FIG. 2 above. For example, the processor 110 may generate the index 108A with a hash of each normalized phrase in a portion in the accessed content 104A. In another example, the processor 110 may generate the index 108A with a hash of each normalized phrase in the accessed content 104A. The processor 110 may use machine learning to generate the index 108A as discussed above with reference to FIG. 1B. In an example, the processor 110 may submit a request to an external server 134C to generate the index 108A based on other content on the network 198 with similar phrases as the ones in the accessed content 104A and may receive the index 108A from the external server 134C.

At block 306, the processor 110 may receive data pertaining to a user interaction with the accessed content 104A via the apparatus 100. The user interaction may be received from the I/O interface 192 as discussed above with reference to FIG. 1B. In examples, the received interaction data may include the amount of time spent at a portion of interest of the accessed content 104A, mouse movements over a certain portion of interest of the accessed content 104A, or the like.

In other examples, the received user interaction data may be the scrolling time over a portion of interest of the accessed content 104A.

At block 308, the processor 110 may determine the certain portion of interest of the accessed content 104A based on the data pertaining to the user interaction received at block 306. In examples, the processor 110 may determine the portion of interest based on the amount of time that the user spent in a portion of a newsletter, the scrolling speed or scrolling time through the portion, and/or the like.

At block 310, the processor 110 may update the index 108A to indicate the determined portion of interest. The update to the index 108A may be hashes of phrases in the portion or hashes that identify the portion based on phrases that define the beginning and the ending of the portion of interest as identified at block 306. The portion of interest of the accessed content 104A may be identified based on hashes of the phrases in the accessed content 104A. For example, the updated index 108B may have a hash of headings before and after the portion of interest in the accessed content 104A.

At block 312, the processor 110 may identify a portion of interest in a subsequently accessed content 104B based on the updated index 108B. For example, the processor 110 may identify a portion of interest in a periodic newsletter such as the summary of recent developments. In another example, the processor 110 may use the index 108B to identify phrases in the subsequently accessed content 104G that are similar to phrases in a previously accessed content 104A, such as a prior read newsletter.

At block 314, the processor 110 may display the identified portion of interest in the subsequently accessed content 104B differently from other portions in the subsequently accessed content 104B. In examples, the processor 110 may identify a portion of interest in the subsequently accessed content 104B and may display the phrases in the identified portion of interest that are similar to the phrases in the previously accessed content 104A differently, such as by highlighting those displayed phrases of the subsequently accessed content 104B.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium storing machine readable instructions that when executed by the processor cause the processor to:
   retrieve an index of entries, the entries in the index representing phrases that convey same or similar meanings with other phrases in documents;
   in response to the apparatus accessing a first content on a network, identify a first phrase in the first content that is similar to a particular phrase represented by a particular entry in the index;
   determine, based on an input on the first content via a user interface, that the first phrase in the first content is a phrase of interest;

update the index to indicate that phrases similar to the particular phrase represented by the particular entry in the index are of interest;

in response to the apparatus accessing a second content on the network subsequent to the first content, determine that a second phrase in the second content is similar to the particular phrase represented by the particular entry in the index; and initiate a change in an appearance of the second phrase displayed on the user interface to distinguish the second phrase from other displayed phrases in the second content.

2. The apparatus of claim 1, wherein the instructions further cause the processor to:

identify a collection of phrases in the second content that are similar to the entries in the index;

determine, based on an input on the second content via the user interface, that a third phrase in the collection of phrases in the second content is of interest; and update the index to indicate that one of the entries in the index that is similar to the third phrase is of interest.

3. The apparatus of claim 2, wherein the instructions further cause the processor to:

determine a ratio of a count of words in the collection of phrases in the second content that are similar to the entries in the index to a count of words in the second content;

determine whether the ratio is within a similarity threshold; and in response to a determination that the ratio is within the similarity threshold, display a link to the second content differently from other links to other content.

4. The apparatus of claim 1, wherein the instructions further cause the processor to:

identify, based on the input on the first content, a certain portion of the first content, the certain portion containing phrases;

determine, based on the input on the first content, whether the phrases in the identified certain portion of the first content have been read; and in response to a determination that the phrases in the identified certain portion have been read, update the index to indicate that the phrases in the identified certain portion that are similar to the entries in the index have been read.

5. The apparatus of claim 1, wherein the instructions further cause the processor to:

identify, based on the input on the first content, a certain portion of the first content, the certain portion containing phrases;

determine, based on the input on the first content, whether the phrases in the identified certain portion of the first content have been read; and in response to a determination that the phases in the identified certain portion of the first content have not been read, not update the index.

6. The apparatus of claim 1, wherein the input on the first content includes an amount of time that a portion of the first content that includes the first phrase is displayed on the user interface, and wherein the instructions further cause the processor to:

determine whether the amount of time is within a time threshold; and in response to a determination that the amount of time is within the time threshold, determine that the first phrase in the first content is the phrase of interest.

7. The apparatus of claim 1, wherein the input on the first content includes a scroll time over a portion of the first content, and wherein the instructions further cause the processor to:

determine whether the scroll time over the portion of the first content is within a scroll threshold; and in response to a determination that the scroll time over the portion of the first content is within the scroll threshold, determine that the portion of the first content has been read.

8. The apparatus of claim 1, wherein the entries in the index comprise hashes of the analogous phrases.

9. A non-transitory computer readable medium on which is stored machine readable instructions that when executed by a processor cause the processor to:

retrieve a plurality of content published on a network, the retrieved plurality of content including phrases;

normalize the phrases included in the retrieved plurality of content;

from the normalized phrases, identify phrases that are analogous to and convey same or similar meanings as other phrases in the retrieved plurality of content;

create an index of hashes, the hashes representing the analogous phrases;

provide the index to a first device, wherein the first device is caused to update the index to identify a hash in the index representing a particular phrase of interest;

receive an updated index from the first device, the updated index identifying the hash representing the particular phrase of interest; and communicate the updated index to a second device t cause the second device to determine that a first phrase in a content displayed on the second device is similar to the particular phrase of interest in the updated index and cause the second device to change an appearance of the first phrase in the content displayed on the second device.

10. The non-transitory computer readable medium of claim 9, wherein the instructions further cause the processor to:

provide another updated index to the first device, wherein the other updated index includes a hash of a content that was published on the network subsequently to the index that was previously provided to the first device.

11. The non-transitory computer readable medium of claim 9, wherein to normalize the phrases, the instructions are executable to cause the processor to:

remove punctuation marks and spaces in the phrases.

12. The non-transitory computer readable medium of claim 9, wherein the instructions further cause the processor to:

identify phrases in the content displayed on the second device that are similar to the hashes in the index;

determine a ratio of a count of words in the phrases in the content that are similar to the hashes in the index to a count of words in the content;

determine whether the ratio is within a similarity threshold; and in response to a determination that the ratio is within the similarity threshold, display a link to the content differently from other links to other content.

13. The non-transitory computer readable medium of claim 9, wherein the instructions further cause the processor to:

determine, based on an input, that a first phrase in the content displayed on the second device is of interest; and update the index to indicate that the first phrase in the content displayed on the second device is of interest.

14. The non-transitory computer readable medium of claim 13, wherein the input on the content displayed on the second device includes a scroll time over a portion of the content, and wherein the instructions further cause the processor to:
determine whether the scroll time over the portion of the content is within a scroll threshold; and
in response to a determination that the scroll time over the portion of the content is within the scroll threshold, determine that the portion of the content has been read.

15. A method comprising:
accessing, by a processor, a first content including phrases;
generating, by the processor, an index of entries based on the phrases included in the first content, the entries in the index representing the phrases in the first content that are analogous to and convey same or similar meanings with other phrases in other content;
receiving an input on the first content on the user device;
determining, by the processor, a first portion of interest in the first content based on the received input on the first content, wherein the first portion of interest is identified by phrases in the first portion of interest;
updating the index to identify particular entries in the index that represent the phrases in the first portion of interest;
in response to accessing a second content, identifying, by the processor, a second portion of the second content that is similar to the first portion of interest based upon a similarity between the second portion of the second content and the phrases in the first portion of interest that are represented by the particular entries in the updated index; and
in response to identifying the second portion of the second content that is similar to the first portion of interest, causing, by the processor, a display appearance of the second portion of the second content to change to distinguish the second portion from other displayed portions of the second content.

16. The method of claim 15, wherein generating the index further comprises:
normalizing the phrases in the first content;
creating a hash of each of the normalized phrases; and
utilizing the created hashes to generate the index.

17. The method of claim 16, wherein normalizing the phrases in the first content includes removing punctuation marks and spaces in the phrases.

18. The method of claim 15, further comprising:
identifying, based on the index, phrases in the second content that are similar to the phrases in the first content;
identifying, based on the index, a third portion of interest in the second content; and
displaying phrases in the third portion of interest differently from other phrases of the second content.

19. The method of claim 15, further comprising:
determining phrases that identify a beginning and an ending of the first portion of interest in the first content; and
updating the index by indicating entries in the index that correspond to the determined phrases, wherein the indicated entries are used to identify the second portion of the second content that is similar to the first portion of interest.

20. The method of claim 15, further comprising:
determining phrases in the first portion of interest in the first content that identify the first portion of interest; and
updating the index with the determined phrases to identify the first portion of interest in the second content.

* * * * *